(12) United States Patent
Cardarelli

(10) Patent No.: US 8,464,433 B1
(45) Date of Patent: Jun. 18, 2013

(54) HUMAN-PORTABLE MEMS AZIMUTH SENSING UNIT AND METHOD

(75) Inventor: Donato Cardarelli, Medfield, MA (US)

(73) Assignee: Milli Sensor Systems & Actuators, Inc., West Newton, MA (US)

( * ) Notice: Subject to any disclaimer, the term of this patent is extended or adjusted under 35 U.S.C. 154(b) by 385 days.

(21) Appl. No.: 12/831,582

(22) Filed: Jul. 7, 2010

Related U.S. Application Data

(60) Provisional application No. 61/223,547, filed on Jul. 7, 2009.

(51) Int. Cl.
*G01C 17/28* (2006.01)

(52) U.S. Cl.
USPC ............................................. 33/318; 33/356

(58) Field of Classification Search
USPC ........................................... 33/318, 324, 356
See application file for complete search history.

(56) References Cited

U.S. PATENT DOCUMENTS

| | | | |
|---|---|---|---|
| 6,725,719 B2 | 4/2004 | Cardarelli | |
| 6,836,971 B1 * | 1/2005 | Wan | 33/356 |
| 6,859,751 B2 | 2/2005 | Cardarelli | |
| 6,871,411 B1 * | 3/2005 | Kang et al. | 33/356 |
| 6,895,678 B2 * | 5/2005 | Ash et al. | 33/313 |
| 6,918,186 B2 * | 7/2005 | Ash et al. | 33/313 |
| 7,093,370 B2 * | 8/2006 | Hansberry et al. | 33/313 |
| 7,168,176 B2 * | 1/2007 | Lee et al. | 33/356 |
| 7,191,636 B2 | 3/2007 | Jaffe | |
| 7,389,590 B2 * | 6/2008 | Lee et al. | 33/356 |
| 7,406,867 B2 | 8/2008 | Cardarelli | |
| 7,412,775 B1 * | 8/2008 | Karnick et al. | 33/324 |
| 7,451,549 B1 * | 11/2008 | Sodhi et al. | 33/356 |
| 7,549,334 B2 | 6/2009 | Cardarelli | |
| 7,730,625 B2 * | 6/2010 | Blake | 33/313 |
| 7,743,519 B2 * | 6/2010 | Kou et al. | 33/356 |
| 7,826,999 B1 * | 11/2010 | Boeen et al. | 33/356 |
| 8,061,047 B2 * | 11/2011 | Igarashi et al. | 33/302 |
| 8,151,475 B2 * | 4/2012 | Albo et al. | 33/318 |
| 8,156,806 B1 * | 4/2012 | Cardarelli | 73/511 |
| 2005/0022404 A1 * | 2/2005 | Ash et al. | 33/366.13 |
| 2005/0126022 A1 * | 6/2005 | Hansberry et al. | 33/313 |
| 2007/0240486 A1 | 10/2007 | Moore et al. | |
| 2007/0245800 A1 | 10/2007 | Shirasaka et al. | |
| 2008/0250661 A1 * | 10/2008 | Kou et al. | 33/356 |
| 2010/0251557 A1 * | 10/2010 | Albo et al. | 33/318 |
| 2010/0294836 A1 * | 11/2010 | Hasselbring | 235/404 |

OTHER PUBLICATIONS

U.S. Appl. No. 12/332,275, filed Dec. 10, 2008, Cardarelli, Donato.
"An Overview of the Allan Variance Method of IFOG Noise Analysis," IEEE Standard Specification Format Guide and Test Procedure, Std 952-1997.
"Inertial Sensor Test Equipment, Instrumentation, Data Acquisition and Analysis," IEEE P1554/D15d, Apr. 2005, pp. 70-110.
Pitman, G.R., Jr., "Inertial Guidance, University of California Engineering and Physical Sciences Extension Series" J. Wiley and Sons Inc., New York, 1962, J.S. Ausman, ch. 3.

\* cited by examiner

*Primary Examiner* — Yaritza Guadalupe-McCall
(74) *Attorney, Agent, or Firm* — Brian M. Dingman; Dingman IP Law, PC

(57) ABSTRACT

A human-portable MEMS azimuth sensing unit and method that determines the azimuth of a target. There is a spinning support structure, with at least a gyroscope carried by the support structure. The gyroscope has an input axis and an output signal. There is an angle resolver that measures the spin angle of the support structure relative to a reference direction and that has an output signal. Circuitry determines the target azimuth based on the phase difference between the output signals of the gyroscope and the angle resolver. The phase difference can be based on the time between zero crossings of the sinusoidal gyro and angle resolver signals. An accelerometer can also be carried by the support structure, in which case its output can be used to level the unit.

9 Claims, 5 Drawing Sheets

HUMAN-PORTABLE MEMS AZIMUTH SENSING UNIT AND METHOD

CROSS-REFERENCE TO RELATED APPLICATION

This application claims priority of Provisional application Ser. No. 61/223,547, with a filing date of Jul. 7, 2009. The entirety of this provisional application is incorporated herein by reference.

FIELD OF THE INVENTION

This invention relates to North-Finding and Azimuth sensing using a spinning planar MEMS IMU with a set of gyroscope and accelerometer sensors integrated on the same chip substrate. The field is a human-portable Far Target Locator, which measures Spin North, target Azimuth and Elevation for the purpose of targeting and firing control. The emphasis is on portability, simplicity and soldier safety.

BACKGROUND OF THE INVENTION

The Far-Target Locator measures target Azimuth relative to Spin North and target elevation from the soldier position. The state-of-the art is a gyrocompass that is large, heavy, costly and requires a stable, aligned platform. What is required for soldier utility is a small, low-weight, portable unit that uses low power. The portability option is a magnetic compass, however it is sensitive to metals and aligns to Magnetic North, which is not stable, and therefore requires frequent corrections.

The traditional gyrocompass procedure applied to MEMS (micro-electromechanical systems) is to align the input axis of a first gyro with Spin North by maximizing the amplitude response of the gyro. The same gyro is then rotated to align with its cross-axis (90 degrees rotation) at which angle no rate exists to find its minimum response. In order to obtain the precision required, a smallest amplitude change corresponding to the angle requirement needs to be detectable. Once aligned with Spin North, the platform is then slewed to align with the target. The angle between Spin North and target is the Azimuth to the target. The Azimuth angle, however, is determined by integrating the rotation rate of a second (slew) gyro with Input Axis along the Vertical. The accuracy of the measurement is due to the accuracy with which Spin North is determined, which depends on the bias stability of the MEMS gyros. We refer to the above description of an Amplitude Gyrocompass to contrast it with the Phase Gyrocompass of this invention. The Azimuth accuracy also depends on the bias stability of the slew gyro and its white noise, which leads to angle random walk error.

Note that bias instability includes short-term (1/f) Bias Instability, Drift Instability and Bias Offset.

SUMMARY OF THE INVENTION

This invention comprises a MEMS gyrocompass that incorporates a gyroscope (gyro) and accelerometer bias stabilization method with a phase method to obtain Spin North and Azimuth simultaneously. The phase method is a by-product of the bias stabilization method to eliminate bias instability from the sensors. Two sinusoidal signals are generated: one referenced to Spin North and the second referenced to the Far Target Location pointer. The phase between the two signals is the Azimuth. The operation of the inventive Phase Gyrocompass is equivalent to the magnetic compass, except it aligns to Spin North which is much more stable than Magnetic North.

The invention features a MEMS Phase Gyrocompass that utilizes the spin of a gyro plus an accelerometer, both integrated with high alignment precision on the same sensor chip, to achieve platform leveling and North Finding with precision and accuracy. The alignment of the gyro and accelerometer Input Axes are fixed and stable to the same axis. The Sensor Chip may contain more than one gyro and one accelerometer. The single gyro and single accelerometer are sufficient for this application. More sensors improve accuracy.

The sensor spin is accomplished by mounting the sensors to a wheel with the wheel Spin Axis normal to the plane of the Sensor Chip. The Input Axes of the gyro and accelerometer are in the plane of the Sensor Chip. The accelerometer Input Axis can be aligned with the gyro Input Axis or orthogonal to it.

The sensor spin provides for the utilization of MEMS for gyrocompassing for both the Amplitude Gyrocompass and Phase Gyrocompass because it removes bias instability from the signals and allows long-term averaging to improve the measurement accuracy. The method of MEMS sensor bias stabilization using spin is referred to herein as Mechanical Phase Sensitive Demodulation (MPSD). It is a means to separate noise from sensor signals in order to resolve the smallest possible signal change. Without stabilization, the signals would drift and not enable long-term averaging to improve target detection to the angle precision required.

Mechanical Phase Sensitive Demodulation requires modulation of the sensor signal to a frequency that is spectrally sufficiently distant from DC so that the bias instability at and near DC can be filtered. The modulation for the MEMS gyro and accelerometer signals is obtained by wheel spin by rotating the Input Axis of the sensors relative to the Input Rates. For the Far Target Locator case, North Finding is about detecting the very stable, but small Earth Spin Rate. This task is enabled if the sensors are sufficiently stable and signal averaging over long periods of time is possible.

The amplitude of the spin rate and hence the spin frequency requires consideration. There is a trade-off between the bandwidth of the stabilized sensor and phase measurement precision. The higher bandwidth provides a greater separation of the signal from the bias instability noise. However, higher frequency modulation waveforms provide a greater challenge to the measurement of phase between the waveforms. For the Far-Target Locator, which is generally set-up for long-term averaging, and because Earth Spin Rate is constant, the bandwidth of the stabilized gyro can be relatively small. The spin rate should only be sufficient to eliminate the bias instability.

The effect of the spin rate on the accelerometer signal is to modulate the signal relative to the Input Velocity Rate (Input Acceleration). For a stationary Far-Target Locator platform, the acceleration is that of gravity (G). Therefore when the accelerometer is aligned with the Vertical, there should be no input acceleration, therefore no modulated accelerometer signal is obtained. As the platform tilts, the accelerometer will sense a component of gravity along the Gravity Axis in the direction of tilt. By applying reference waveforms related to the orthogonal tilt directions in the plane, the separate gravity tilt components will be obtained. The tilt signals can then be used with two feedback control loops to return the platform to its level orientation. Leveling of the platform is necessary to make an accurate measurement of Spin North and Azimuth. The platform can use gimbals to maintain level. The use of a single accelerometer provides an advantage in that the same sensor essentially measures both tilt components rather than two accelerometers with different characteristics and stabilities. Instead of leveling the platform using gimbals, the tilt can be compensated in the gyro signal.

Gyrocompass operation is a natural by-product of the spin to cause modulation of the sensor signal. For the gyro, the modulation is a sinusoid, the amplitude of which is maximum when the gyro Input Axis is aligned with Spin North. Regardless of the orientation of the platform about the Vertical, the gyro signal sinusoid will always align with Spin North much like the needle of a magnetic compass aligns with magnetic north. The wheel spin angle is obtained with an angle resolver built into the spin wheel, which generates a resolver sinusoid signal related to the spin angle; wheel spin angle resolvers that output sinusoidal signals are known in the art. The resolver sinusoid signal can be set to peak with the pointer of the compass. Therefore as the wheel spins, two sinusoids are generated: one due to the gyro signal and the second due to the resolver signal. By rotating the pointer to the target, like a magnetic compass, the Spin North remains stationary while the pointer is rotated. The Azimuth angle is then the phase between the two sinusoids.

The phase between the two sinusoids is preferably measured using zero crossing detectors and phase meters that measure time.

The precision with which Spin North and Azimuth are measured is the same.

A notable difference between the traditional prior-art Amplitude Gyrocompass and the inventive Phase Gyrocompass is that the amplitude method deals with the detection of a small signal amplitude change whereas the phase method deals with a small phase change (difference between zero crossing times).

By aligning the in-plane sensor input axes with the platform pointer, the tilt axes are the one aligned with the pointer direction (Sideways Axis) and the one orthogonal to the pointer direction (Forward Axis). The Forward tilt component in this case becomes the Elevation Angle.

An advantage of phase measurement is that, to first order, the amplitude of the gyro signal is not important to the determination of Azimuth. This means that the gyro scale factor will not need to be controlled as rigidly.

One necessary requirement of the spin-stabilized gyro is that its precision is sufficient to resolve Earth Rate and the white noise is sufficiently low to measure zero crossing to the required precision and accuracy. The phase is related to the time between zero crossings for the gyro signal and angle resolver. In this case, for 1 milliradian target alignment precision, the minimum detectable time difference, $$\Delta T = \frac{T_o \delta}{2\pi} \approx 10^{-5} \sec, \text{ where } T_o = 0.1$$

sec for a spin rate of 10 Hz and alignment angle (or phase) $\delta = 10^{-3}$ rad, for an angular resolution of 1 mrad.

The minimum set of sensors required for the leveling and Azimuth measurement functions includes one accelerometer and one gyro, both having their input axis in the plane of the spinning Sensor Chip, with their input axes alignment being fixed and stable to the same axis. More sensors increase the number of Azimuth measurements made per spin cycle, thereby increasing the measurement precision. It would also be possible to operate with another means of gyrocompass leveling, in which case the azimuth sensing unit can use only a single gyro, along with the angle resolver.

Spin stabilization requires that the spin does not disrupt the physical operation of the sensor. Therefore not all sensor designs may be suitable. In particular the gyro sensor should not detect the wheel spin rate hence its cross-axis sensitivity needs to be very small. The wheel and Sensor Chip need to have the same planarity otherwise, the spin rate will be detected by the gyro and introduce a gyrocompass error with its own instabilities that may be much larger than Earth Rate.

The measurements of Spin North and target Azimuth are made simultaneously with each spin cycle. The measurements are not made at different times, with different sensors and with different methods. The precision of each measurement is the same. The phase measurement is essentially a differential measurement.

The phase method of the invention can be a basis for a more general gyro compass and can be used for navigation, whereby the point (Azimuth) direction is the direction of travel. This gyrocompass enables autonomous operation in general. Soldier navigation is another application that is useful if the measurements are made when stationary so as not to incur errors due to soldier tilting.

The measurement of elevation can be accomplished by pointing the platform to the elevated target and measuring the tilt. The tilt can be measured as a separate step if the tilt angle affects the measurement of Azimuth.

The phase measurement is made over the spin cycle and is independent of spin frequency. By spinning at a slower rate the accuracy and precision of the phase measurement via zero crossing times is improved since the time period of the cycle is larger.

The spinning wheel also provides angular momentum stability. If spun sufficiently fast, it can also be used as a Vertical Gyro for also measuring tilts. Generally, however the intention is to maintain the wheel platform stable.

This invention features an azimuth sensing unit that determines the azimuth of a target, comprising a spinning wheel, a platform that carries the spinning wheel and defines a pointer to be aimed at the target, a gyroscope carried by the wheel and that has an input axis and a sinusoidal output signal, and an accelerometer carried by the wheel and having an input axis and an output signal. The gyroscope and the accelerometer are both MEMS devices and are both fabricated on the same chip. The input axes of the gyroscope and accelerometer are orthogonal and co-planar. There is an angle resolver that measures the spin angle of the wheel relative to a reference direction and has a sinusoidal output signal, circuitry and leveling devices, responsive to the accelerometer output signal and the resolver output signal, that automatically level the wheel such that the input axes of the gyroscope and the accelerometer are orthogonal to the local vertical, and circuitry that determines the target azimuth based on the phase difference between the output signals of the gyroscope and the angle resolver, wherein the phase difference is determined based on the time difference of the zero crossings of the two sinusoidal signals.

Also featured is an azimuth sensing unit that determines the azimuth of a target, comprising a spinning support structure, a gyroscope carried by the support structure and having an input axis and an output signal, an angle resolver that measures the spin angle of the support structure relative to a reference direction and having an output signal, and circuitry that determines the target azimuth based on the phase difference between the output signals of the gyroscope and the angle resolver. The azimuth sensing unit may further comprise an accelerometer carried by the support structure and having an input axis and an output signal. The azimuth sensing unit may further comprise a device, responsive to the accelerometer output signal and the resolver output signal, that automatically levels the support structure such that the input axes of the gyroscope and the accelerometer are orthogonal to the local vertical. The gyroscope and the accelerometer are preferably both MEMS devices, and are preferably both fabricated on the same chip. The input axes of the gyroscope and accelerometer are preferably orthogonal and co-planar. The circuitry that determines the target azimuth may further be based on the accelerometer output signal. The gyroscope and resolver output signals are preferably both sinusoidal, and the circuitry determines the target azimuth based on the phase difference between the two signals. The phase difference may be determined based on the time difference of the zero crossings of the two sinusoidal signals.

The invention also features a method of determining the azimuth of a target, comprising providing an azimuth sensing unit comprising a spinning wheel, a platform that carries the spinning wheel and defines a pointer to be aimed at the target, a gyroscope carried by the wheel and that has an input axis and a sinusoidal output signal, an accelerometer carried by the wheel and having an input axis and an output signal; wherein the gyroscope and the accelerometer are both MEMS devices and are both fabricated on the same chip, and wherein the input axes of the gyroscope and accelerometer are orthogonal and co-planar, and an angle resolver that measures the spin angle of the wheel relative to a reference direction and has a sinusoidal output signal, providing circuitry and leveling devices, responsive to the accelerometer output signal and the resolver output signal, that automatically level the wheel such that the input axes of the gyroscope and the accelerometer are orthogonal to the local vertical, and determining the target azimuth based on the phase difference between the output signals of the gyroscope and the angle resolver, wherein the phase difference is determined based on the time difference of the zero crossings of the two sinusoidal signals.

BRIEF DESCRIPTION OF THE DRAWINGS

Other objects, features and advantages will occur to those skilled in the art from the following descriptions of the preferred embodiments, and the accompanying drawings, in which.

DESCRIPTION OF THE PREFERRED EMBODIMENTS

Introduction

A preferred embodiment of the invention accomplishes a practical implementation for measuring Spin North and Azimuth based on a MEMS gyro and an accelerometer that are spun about the Vertical Axis. The spin removes bias instability from the sensor signals enabling cleaner signals with higher resolution (precision) and accuracy without drift. The drift-free character makes the sensors capable of gyrocompassing over longer periods of time to improve the detection of Earth Rate through averaging. The gyro and accelerometer Input Axes are aligned to the same axis so that when the accelerometer alignment is made, the gyro obtains the most accurate detection of Spin North.

As the wheel spins, the accelerometer detects tilt of the wheel/platform relative to the Gravity Axis and the gyro detects Earth Rate about Spin North. Both signals are sinusoidal modulations that peak when the gyro Input Axis is aligned with Spin North and the accelerometer Input Axis is aligned with the direction of tilt. An angle resolver built into the wheel provides a sinusoidal signal related to the spin angle. By aligning the peak of the angle resolver with the Far Target Locater pointer, the angle relationship between Spin North and Target (Azimuth) is obtained and the two in-plane tilt angles relative to the pointer body axes can be obtained.

Spin Stabilization

Figure 1:
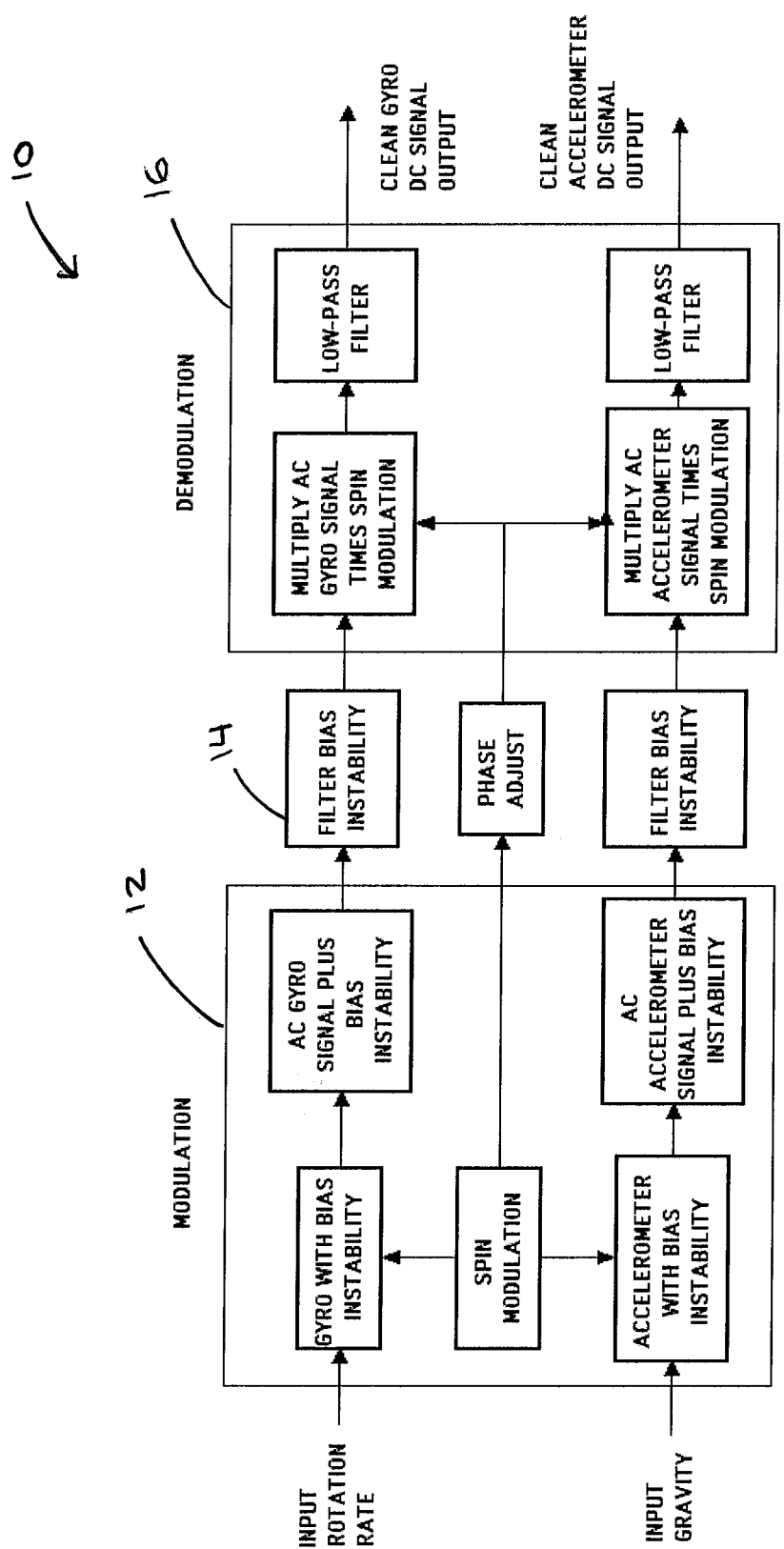
FIG. 1 is a functional block diagram of an embodiment of a bias stabilization system and method applied to MEMS gyros and accelerometers that can be used in an embodiment of the invention.

A spin stabilization system 10 is described using one gyro and one accelerometer with the schematic in FIG. 1. Spin stabilization is important for the gyrocompass because it eliminates bias instability, especially drift, and enables operation over extended spin cycles to improve precision through averaging. The method is generally referred to as Phase Sensitive Detection, which is already used in Lock-in Amplifiers, for example. For use with MEMS sensors, this technique can be referred to as Mechanical Phase Sensitive Detection. The description of the spin stabilization system and method follows.

A gyro signal generally contains bias instability. While at rest, the bias instability can be measured and/or eliminated. Unfortunately it changes readily in time as environmental influences affect the sensor. While underway bias instability is an unknown because the signal is also present. Influences during operation such as highly dynamic maneuvers can also contribute to the bias instability. In order for the sensor to be useful then, especially over long periods of time, it is necessary to separate the signal from the bias instability. This is accomplished by spinning the sensor Input Axis about the wheel Spin Axis causing the sensor Input Axis to rotate relative to the input rate. The result is a modulation of the sensor signal that is accomplished in modulation stage 12. The modulated sensor signal peaks when the sensor Input Axis is aligned in the plane with the Input Rate. For the gyrocompass the Input Rotation Rate is the Earth Rate. For the tilt, the Input Rate is the Velocity Rate (Gravity). The importance of the modulation is that it can be done at a high rate to accomplish spectral separation from the bias instability at and near DC. The bias instability can then be filtered, step 14, and the signals returned to DC in the demodulation stage 16. For the Phase Gyrocompass, the gyro modulation signals are used and do not need to be demodulated to DC.

Note that in addition to Drift, the 1/f instability is also filtered.

By applying the spin continuously, the bias instability is continuously removed from the gyro and accelerometer signals.

Traditional Azimuth Measurement Method

Figure 2:
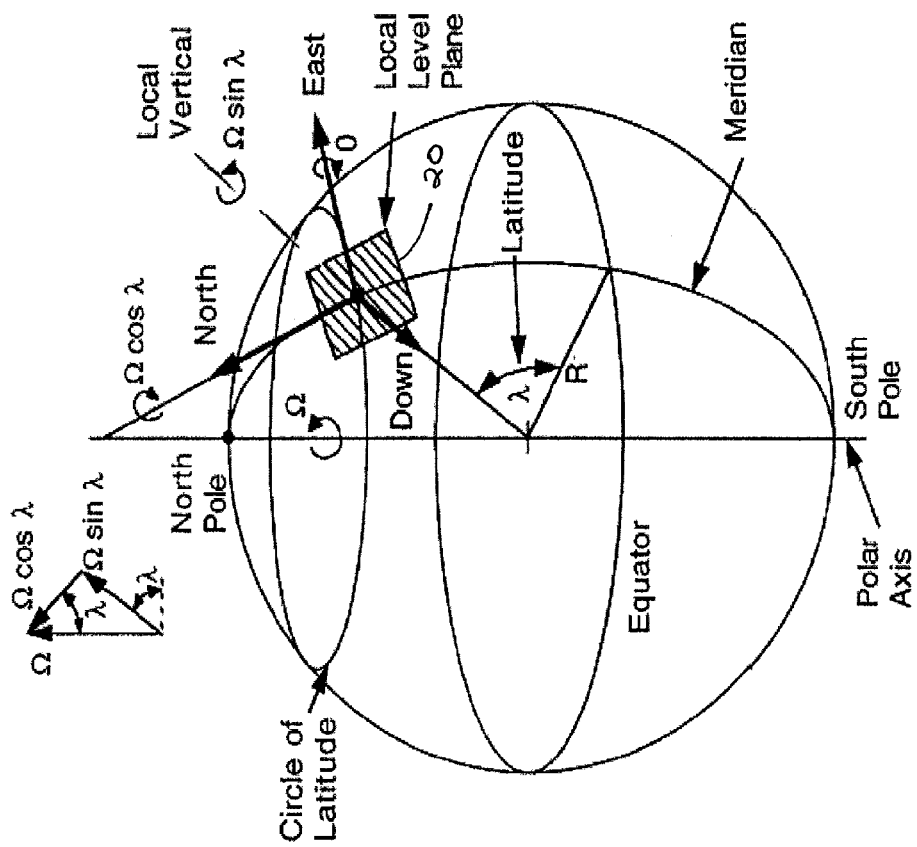
FIG. 2 is a schematic representation of the Earth that is useful to describe the gyrocompass task for measuring target Azimuth.

The traditional Azimuth measurement method for a far-target locator is described with FIG. 2. The soldier is located at some latitude and longitude. The target needs to be related to the soldier location. The platform 20 is mounted flat with an initial alignment to the local Vertical. The task is to find Spin North and then measure the Azimuth angle to the target. Since the Earth is spinning, the approach is to detect Spin North using a gyroscope of sufficient sensitivity (precision) and accuracy. When the gyro Input Axis is aligned with the northerly direction, a maximum signal is obtained. The northerly direction is aligned with a meridian that runs along the soldier's longitude. The Earth Rate at a certain latitude, $\lambda$, is given by $\Omega_\lambda = \Omega \cos \theta$, where $\Omega$ is the Earth Rate at the North Pole. When optimally aligned, a second gyro, orthogonal to the first, would have an output of zero to the precision of its resolution, provided it has no bias component (not drifting). Given the Earth Rate at the Boston, Mass. USA Latitude of about $\Omega_{Boston}=10$ deg/hr, a 1 milliradian target accuracy and alignment with Spin North requires a gyro resolution of about 0.01 deg/hr.

Leveling is required for accuracy and the normal to the plane of the measurement platform is aligned with the local Vertical. Drift in the sensors can be a problem and means are necessary to circumvent drift for Azimuth sensing as well as leveling.

Once Spin North is found, the platform is rotated about the local Vertical to the target. A second gyro is necessary to measure the slew rate to the target so that the angle can be calculated by integration. Finding North and measuring Azimuth require two steps.

Azimuth Measurement Based on Spin Modulation

As discussed above, spinning the gyro and accelerometer sensors enables the elimination of bias (especially drift) from their signals. And because the bias instability is removed, the resolution of the sensors can be improved by integrating the signal over a longer period of time. This same spinning set of sensors can also be used to sense the Earth Rate component at the soldier's latitude about the northerly direction along the meridian. Since the only rotational input is that of the Earth, then the gyro signal will peak when its Input Axis comes into alignment with the northerly direction. The gyro signal will constitute a sinusoidal waveform with the period of one spin cycle and amplitude corresponding to the local Earth Rate. With each rotation cycle the same waveform is obtained provided the local level is maintained. In this case the level is maintained by observing the output of the accelerometer. When the platform is level, the accelerometer signal has zero amplitude. With a platform tilt, the accelerometer will sense a component of G and also generate a sinusoidal waveform that peaks with tilt direction. For a platform that is instrumented to re-balance the tilt about the X-axis and Y-axis, the total tilt is decomposed into components about the X and Y axes to obtain the error values. The decomposition is accomplished by splitting the accelerometer signal and multiplying the first signal with a resolver reference waveform phased to the X-axis and the second signal multiplied by a second resolver reference waveform phased to the Y-axis (phase-shifted by 90 degrees). The appropriate leveling torques can be applied for a closed-loop platform or the appropriate compensation can be applied to the gyro Azimuth value if the tilt is known.

Figure 3:
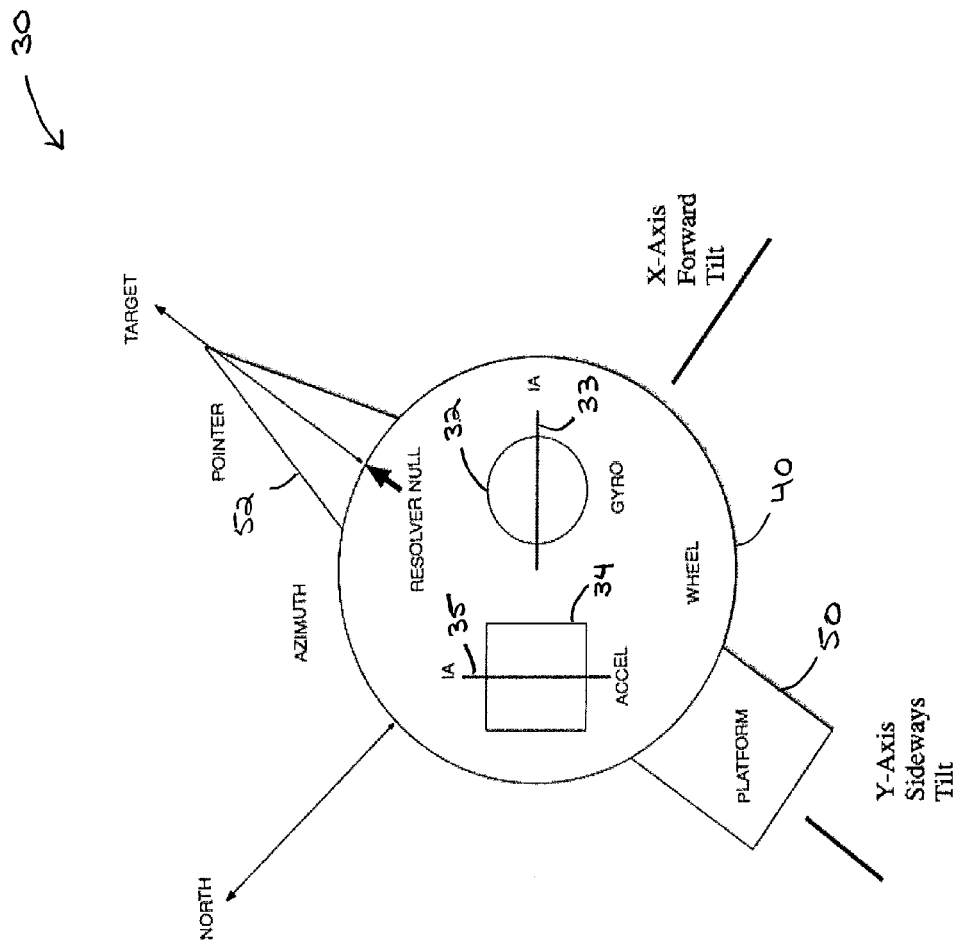
FIG. 3 is a schematic top view of a gyro-compass for an embodiment of the invention integrated with the target Azimuth platform.
Figure 4:
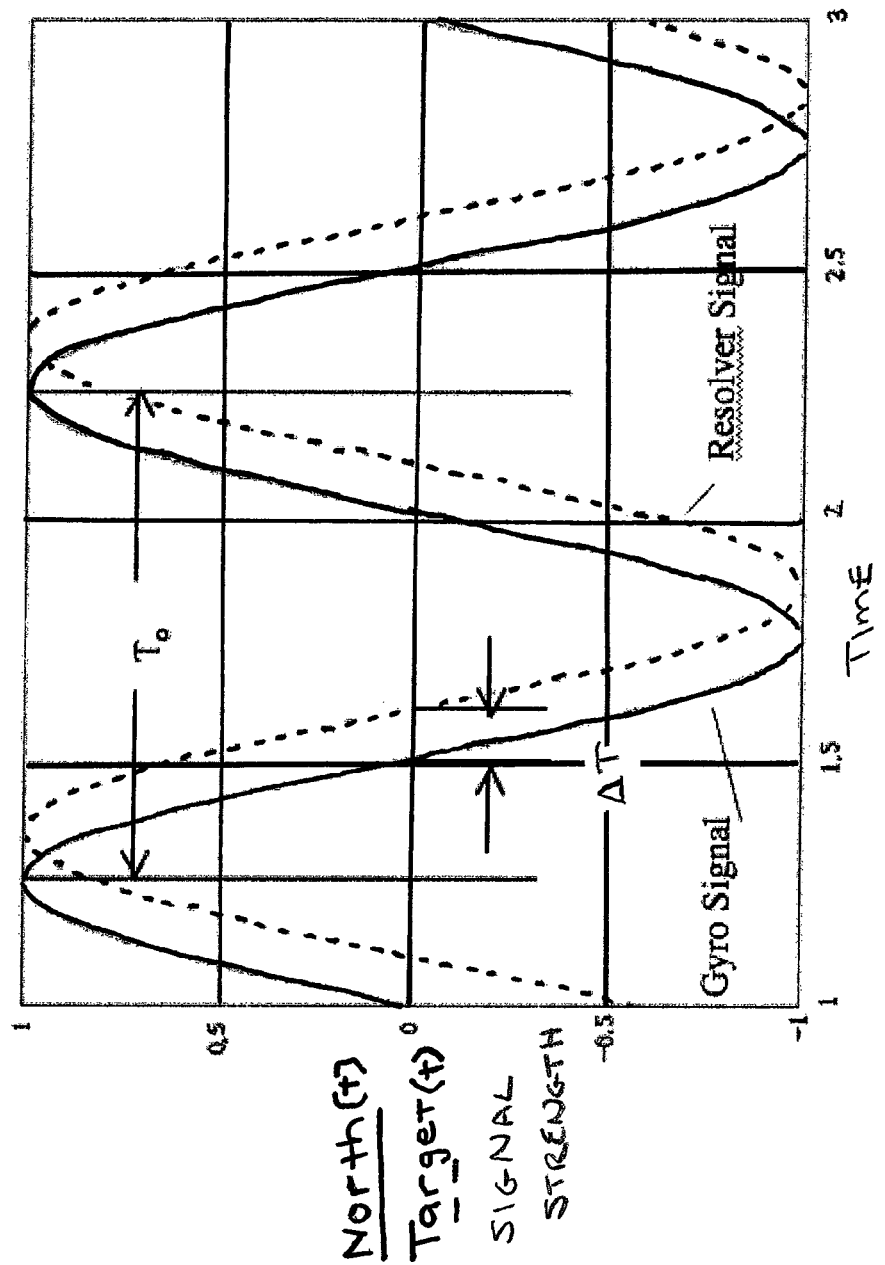
FIG. 4 shows an example of the gyro and resolver signals and the phase between them for an embodiment of the invention.

One Phase Gyrocompass embodiment 30 of the invention is shown in FIG. 3. One gyro 32 and one accelerometer 34 are mounted onto a spinning wheel 40 that is mounted onto the fixed Far Target Locator platform 50 in such a manner as to allow rotation of wheel 40 relative to platform 50. The platform can be mounted to a tripod, a rifle, mortar launcher, etc. The platform has a pointer 52. An angle resolver (not shown) is built into the wheel to measure the spin angle relative to the platform pointer. The spin angle resolver is initialized so that the peak of the resolver signal occurs when the resolver angle is aligned with the pointer; such spin angle resolvers are known in the art. The gyro and accelerometer Input Axes 33 and 35, respectively, are aligned orthogonally to each other in this example. They can also be parallel without loss of generality. The wheel is made to spin to start operation. The operator aims the platform pointer at the target and holds. Two sinusoidal waveforms are generated: the gyro signal modulation and the resolver reference waveform as shown in FIG. 4. Both have the same wavelength. The phase between them is the Azimuth relative to Spin North (northerly direction). The measurement can be obtained, for example, by measuring the time, $\Delta T$, between the two zero crossings.

A MEMS IMU with one or more gyros and one or more accelerometers on a chip is disclosed in U.S. Pat. No. 6,725,719, the disclosure of which is incorporated herein by reference. A mini-IMU used for spin stabilization is disclosed in U.S. patent application Ser. No. 12/332,275, the disclosure of which is incorporated herein by reference. An angle resolver with a sinusoidal output signal is disclosed in U.S. Pat. No. 7,549,334, the disclosure of which is incorporated herein by reference.

The Azimuth measurement is made with one step, aiming the pointer at the target. The spin allows the Phase Gyrocompass to continuously find the Spin North relative to the target. And since the spin is continuous, the phase measurement continues to improve by averaging over more than one cycle. To improve the measurement of phase the signals are preferably processed where they cross zero. For a phase angle of $$\delta = \frac{\Delta T}{T_o} 2\pi,$$

the actual measurement is made by measuring the time between zero crossings. For a spin rate of 10 Hz (revs/sec), $T_O$=0.1 sec. For an Azimuth target resolution of 1 milliradian, $\delta_{res}=10^{-3}$ radian. The time difference between zero crossings in this example is about $\Delta T \approx 10^{-5}$ sec.

Leveling is preferably accomplished by sensing gravity with the single accelerometer as discussed above. Leveling could be accomplished in other manners that would be apparent to those skilled in the field. By using the resolver waveforms referenced to the pointer, the amount of tilt forward (about the X-axis) and sideways (about the Y-axis) can be determined. The target elevation angle is equal to the tilt forward, provided the sideways tilt is zero.

Figure 5:
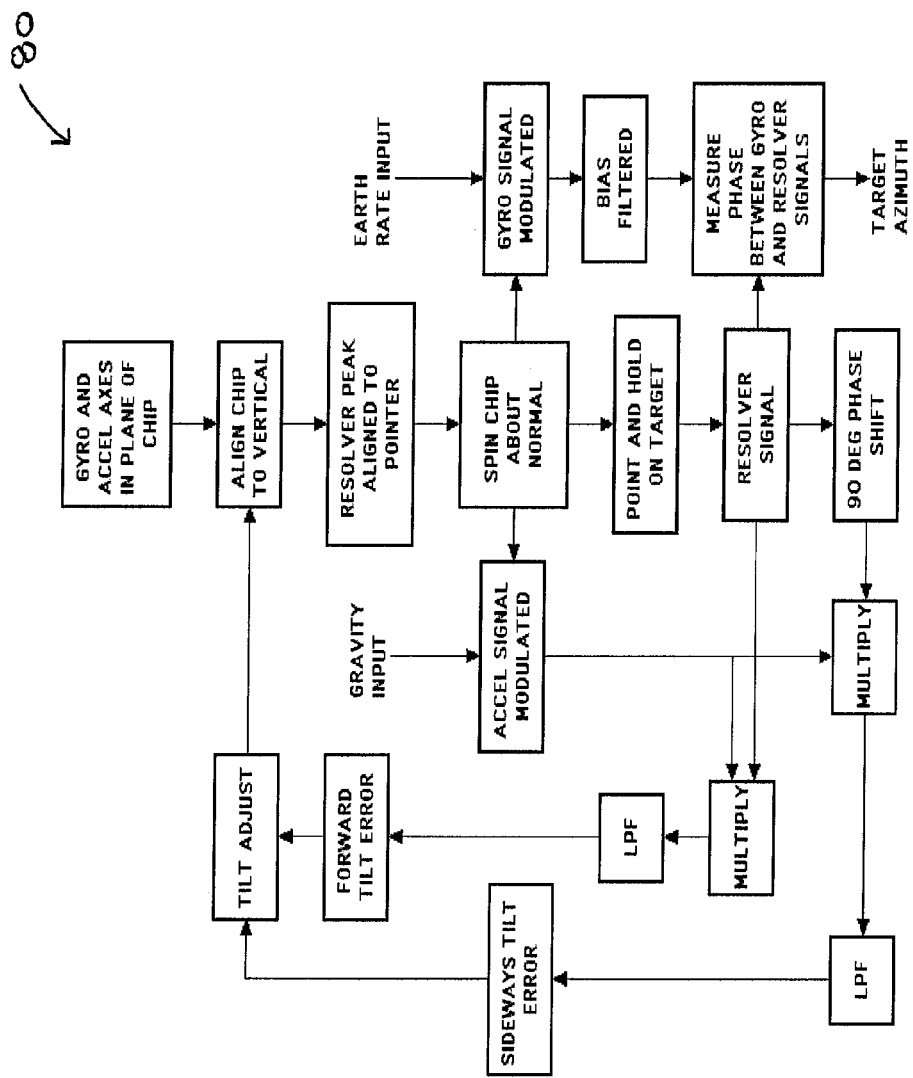
FIG. 5 is a schematic block diagram of the gyrocompass method for measuring Azimuth used in an embodiment of the invention.

A control schematic 80 for target Azimuth acquisition is described in FIG. 5. The gyro and accelerometer have axes in the plane of the chip. The two input axes are orthogonal for this case. The plane of the chip is initially aligned with its normal parallel to the local Vertical. The resolver peak signal is aligned to the platform Far Target Locator pointer. The wheel with the Sensor Chip mounted on it is spun about the normal to the plane. The chip contains at least one gyro and one accelerometer that are precisely aligned to the same axes. The platform pointer is aimed at the target and held stationary. The spinning wheel modulates the gyro signal as the gyro Input Axis rotates relative to Spin North. The resolver signal also varies as the wheel rotates relative to the pointer direction. By measuring the phase between the two signals, a direct measure of the Azimuth angle is obtained. For different target locations the pointer is rotated relative to Spin North and as it does, the angle resolver signal phase translates with the pointer angle and the phase of Spin North varies relative to the new Azimuth angle. In fact the northerly direction is stationary and the target angle is varied.

For leveling, the resolver signal referenced to the pointer will demodulate the forward tilt and by phase shifting the resolver signal by 90 degrees, the sideways tilt component can be demodulated. Note that for tilt measurement, the signals are demodulated to the DC level. In the drawing, "LPF" stands for low-pass filter. The error values are then fed with control loops to correct tilt adjust mechanisms. For the Azimuth measurement, the waveforms are used directly (demodulation is not used).

The accuracy of the phase method depends on how well the zero crossings can be determined. White noise will influence the resolution. Difference phase measurement methods are available.

The invention claimed is:

1. An azimuth sensing unit that determines the azimuth of a target, comprising:
   a spinning wheel;
   a platform that carries the spinning wheel and defines a pointer to be aimed at the target;
   a gyroscope carried by the wheel and that has an input axis and a sinusoidal output signal;
   an accelerometer carried by the wheel and having an input axis and an output signal
   wherein the gyroscope and the accelerometer are both MEMS devices and are both fabricated on the same chip, and wherein the input axes of the gyroscope and accelerometer are orthogonal or co-linear, and co-planar with the wheel;
   an angle resolver that measures the spin angle of the wheel relative to a reference direction and has a sinusoidal output signal;
   circuitry and leveling devices, responsive to the accelerometer output signal and the resolver output signal, that automatically level the wheel such that the input axes of the gyroscope and the accelerometer are orthogonal to the local vertical; and
   circuitry that determines the target azimuth based on the phase difference between the output signals of the gyroscope and the angle resolver, wherein the phase difference is determined based on the time difference of the zero crossings of the two sinusoidal signals.

2. An azimuth sensing unit that determines the azimuth of a target, comprising:
   a spinning support structure;
   a gyroscope carried by the support structure and having an input axis and an output signal;
   an angle resolver that measures the spin angle of the support structure relative to a reference direction and having an output signal;
   circuitry that determines the target azimuth based on the phase difference between the output signals of the gyroscope and the angle resolver;
   an accelerometer carried by the support structure and having an input axis and an output signal; and
   a device, responsive to the accelerometer output signal and the resolver output signal, that automatically levels the support structure such that the input axes of the gyroscope and the accelerometer are orthogonal to the local vertical.

3. The azimuth sensing unit of claim 2 in which the gyroscope and the accelerometer are both MEMS devices.

4. The azimuth sensing unit of claim 3 in which the gyroscope and the accelerometer are both fabricated on the same chip.

5. The azimuth sensing unit of claim 2 in which the input axes of the gyroscope and accelerometer are orthogonal or co-linear, and co-planar with the wheel.

6. The azimuth sensing unit of claim 2 in which the circuitry determines the target azimuth further based on the accelerometer output signal.

7. An azimuth sensing unit that determines the azimuth of a target, comprising:
   a spinning support structure:
   a gyroscope carried by the support structure and having an input axis and an output signal;
   an angle resolver that measures the spin angle of the support structure relative to a reference direction and having an output signal; and
   circuitry that determines the target azimuth based on the phase difference between the output signals of the gyroscope and the angle resolver;
   in which the gyroscope and resolver output signals are both sinusoidal, and the circuitry determines the target azimuth based on the phase difference between the two signals.

8. The azimuth sensing unit of claim 7 in which the phase difference is determined based on the time difference of the zero crossings of the two sinusoidal signals.

9. A method of determining the azimuth of a target, comprising:
   a) providing an azimuth sensing unit comprising a spinning wheel, a platform that carries the spinning wheel and defines a pointer to be aimed at the target, a gyroscope carried by the wheel and that has an input axis and a sinusoidal output signal, an accelerometer carried by the wheel and having an input axis and an output signal; wherein the gyroscope and the accelerometer are both MEMS devices and are both fabricated on the same chip, and wherein the input axes of the gyroscope and accelerometer are orthogonal or co-linear, and co-planar with the wheel, and an angle resolver that measures the spin angle of the wheel relative to a reference direction and has a sinusoidal output signal;
   b) providing circuitry and leveling devices, responsive to the accelerometer output signal and the resolver output signal, that automatically level the wheel such that the input axes of the gyroscope and the accelerometer are orthogonal to the local vertical; and
   c) determining the target azimuth based on the phase difference between the output signals of the gyroscope and the angle resolver, wherein the phase difference is determined based on the time difference of the zero crossings of the two sinusoidal signals.

* * * * *